United States Patent
Andreoli-Fang et al.

(10) Patent No.: US 11,070,323 B2
(45) Date of Patent: Jul. 20, 2021

(54) HYBRID AUTOMATIC REPEAT REQUEST (HARQ) IN LISTEN BEFORE TALK SYSTEMS

(71) Applicant: CABLE TELEVISION LABORATORIES, INC., Louisville, CO (US)

(72) Inventors: Jennifer Andreoli-Fang, Boulder, CO (US); Alireza Babaei, Herndon, VA (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 16/787,328

(22) Filed: Feb. 11, 2020

(65) Prior Publication Data
US 2020/0228256 A1 Jul. 16, 2020

Related U.S. Application Data

(63) Continuation of application No. 15/569,153, filed as application No. PCT/US2016/032569 on May 14, 2016, now Pat. No. 10,560,228.
(Continued)

(51) Int. Cl.
*H04L 1/18* (2006.01)
*H04L 5/00* (2006.01)
(Continued)

(52) U.S. Cl.
CPC .......... *H04L 1/1832* (2013.01); *H04L 1/0058* (2013.01); *H04L 1/0061* (2013.01); *H04L 1/08* (2013.01); *H04L 1/187* (2013.01); *H04L 1/1825* (2013.01); *H04L 1/1893* (2013.01); *H04L 5/0055* (2013.01); *H04W 72/1284* (2013.01); *H04W 72/14* (2013.01);
(Continued)

(58) Field of Classification Search
CPC ..................................................... H04L 1/1832
USPC ............................... 714/748, 747, 752, 749
See application file for complete search history.

(56) References Cited

U.S. PATENT DOCUMENTS 6,977,888 B1  12/2005  Frenger et al.
8,340,586 B2 * 12/2012  Wellington ........... H04L 1/0016
                                                    455/67.11
(Continued)

OTHER PUBLICATIONS

International Search Report in corresponding PCT application serial No. PCT/US16/32569, dated Aug. 22, 2016.
(Continued)

*Primary Examiner* — Fritz Alphonse
(74) *Attorney, Agent, or Firm* — David Daniel Smith; Cable Television Laboratories, Inc.

(57) ABSTRACT

Systems and methods presented herein provide for increasing a contention window of a UE employing a LTE communications operating in a radio frequency (RF) band comprising a conflicting wireless technology. In one embodiment, an eNodeB receives a transport block of data from a user equipment (UE). The transport block includes a cyclic redundancy check (CRC). The eNodeB then determines a checksum of the transport block based on the CRC, fails the checksum, and transmits a non-acknowledgement (NACK) of the transport block to the UE based on the failed checksum. The UE, in response to the NACK, increases a contention window and re-transmits the transport block to the eNodeB.

20 Claims, 9 Drawing Sheets

Related U.S. Application Data (60) Provisional application No. 62/161,443, filed on May 14, 2015.

(51) Int. Cl.

| | | |
|---|---|---|
| *H04W 72/12* | (2009.01) | |
| *H04W 72/14* | (2009.01) | |
| *H04L 1/00* | (2006.01) | |
| *H04L 1/08* | (2006.01) | |
| *H04W 74/00* | (2009.01) | |
| *H04W 74/08* | (2009.01) | |
| *H04W 84/04* | (2009.01) | |
| *H04W 88/06* | (2009.01) | |

(52) U.S. Cl.
CPC .......... *H04W 74/006* (2013.01); *H04W 74/08* (2013.01); *H04W 84/042* (2013.01); *H04W 88/06* (2013.01)

(56) References Cited

U.S. PATENT DOCUMENTS

| | | | |
|---|---|---|---|
| 8,942,142 B2* | 1/2015 | Lin | ........................ H04L 5/0053 370/280 |
| 9,369,238 B2 | 6/2016 | Astely et al. | |
| 9,497,756 B2 | 11/2016 | Dinan | |
| 2007/0237117 A1 | 10/2007 | Moon et al. | |
| 2013/0095760 A1 | 4/2013 | Thota et al. | |
| 2014/0086175 A1 | 3/2014 | Hakola et al. | |
| 2017/0048861 A1 | 2/2017 | Choi et al. | |
| 2018/0152267 A1* | 5/2018 | Andreoli-Fang | ..... H04L 1/0061 |
| 2018/0175975 A1 | 6/2018 | Um et al. | |
| 2019/0021109 A1* | 1/2019 | Yi | ......................... H04L 1/1812 |
| 2020/0107322 A1* | 4/2020 | Lunttila | ............ H04W 74/0833 |

OTHER PUBLICATIONS

Wong, D., et al. "Wireless Broadband Networks" [online] Mar. 2009; http://www.wiley.com/WileyCDS/WileyTitle/produceCd-047018177X.html. Chapter 11, pp. 404-408, ISBN: 978-0-470-18177-5.

\* cited by examiner

HYBRID AUTOMATIC REPEAT REQUEST (HARQ) IN LISTEN BEFORE TALK SYSTEMS

CROSS REFERENCE TO RELATED APPLICATIONS

This patent application is a continuation of U.S. patent application Ser. No. 15/569,153, filed Oct. 25, 2017, which application is a national stage application of PCT Application No. PCT/US16/32569, filed May 14, 2016, which application claims priority to, and thus the benefit of an earlier filing date from, U.S. Provisional Patent Application No. 62/161,443, filed May 14, 2015, the entire contents of which are hereby incorporated by reference.

BACKGROUND

Cellular telephony continues to evolve at a rapid pace. Cellular telephone networks currently exist in a variety of forms and operate using a variety of modulations, signaling techniques, and protocols, such as those found in 3G and LTE networks (3rd Generation of mobile telecommunications technology and Long Term Evolution, respectively). As consumers require more capacity, the networks evolve. For example, some carriers, or Mobile Network Operators (MNOs), employ a combination of 3G and the faster LTE because MNOs needed faster networks to satiate the increased demand for data and voice.

Moreover, efforts exist to implement these technologies in radio frequency (RF) bands that comprise conflicting communications. For example, there has been accelerated development of LTE in unlicensed bands (a.k.a. LTE-U and Licensed-Assisted-Access, or "LAA-LTE") where WiFi has traditionally been implemented. Unlike LTE, however, WiFi employs a method of Listen Before Talk (LBT) to ensure that WiFi systems do not interfere with one another. With LBT in WiFi, a WiFi node determines that a transmission is successful if it receives an acknowledgement (ACK) shortly after the transmission. The lack of an ACK means that a collision has occurred and the WiFi node doubles its contention window and re-contends for the channel. However, because Hybrid Automatic Repeat Request (HARQ) ACKs and non-acknowledgements (NACKs) are sent in 3 subframes (i.e., 3 ms after the transmission of data), LTE systems have difficulty changing a contention window size.

SUMMARY

Systems and methods presented herein provide for increasing a contention window of a UE employing LTE communications operating in an RF band comprising a conflicting wireless technology. In one embodiment, an eNodeB receives a transport block of data from a user equipment (UE). The transport block includes a cyclic redundancy check (CRC). The eNodeB then determines a checksum of the transport block based on the CRC, fails the checksum, and transmits a non-acknowledgement (NACK) of the transport block to the UE based on the failed checksum. The UE, in response to the NACK, increases a contention window and re-transmits the transport block to the eNodeB.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
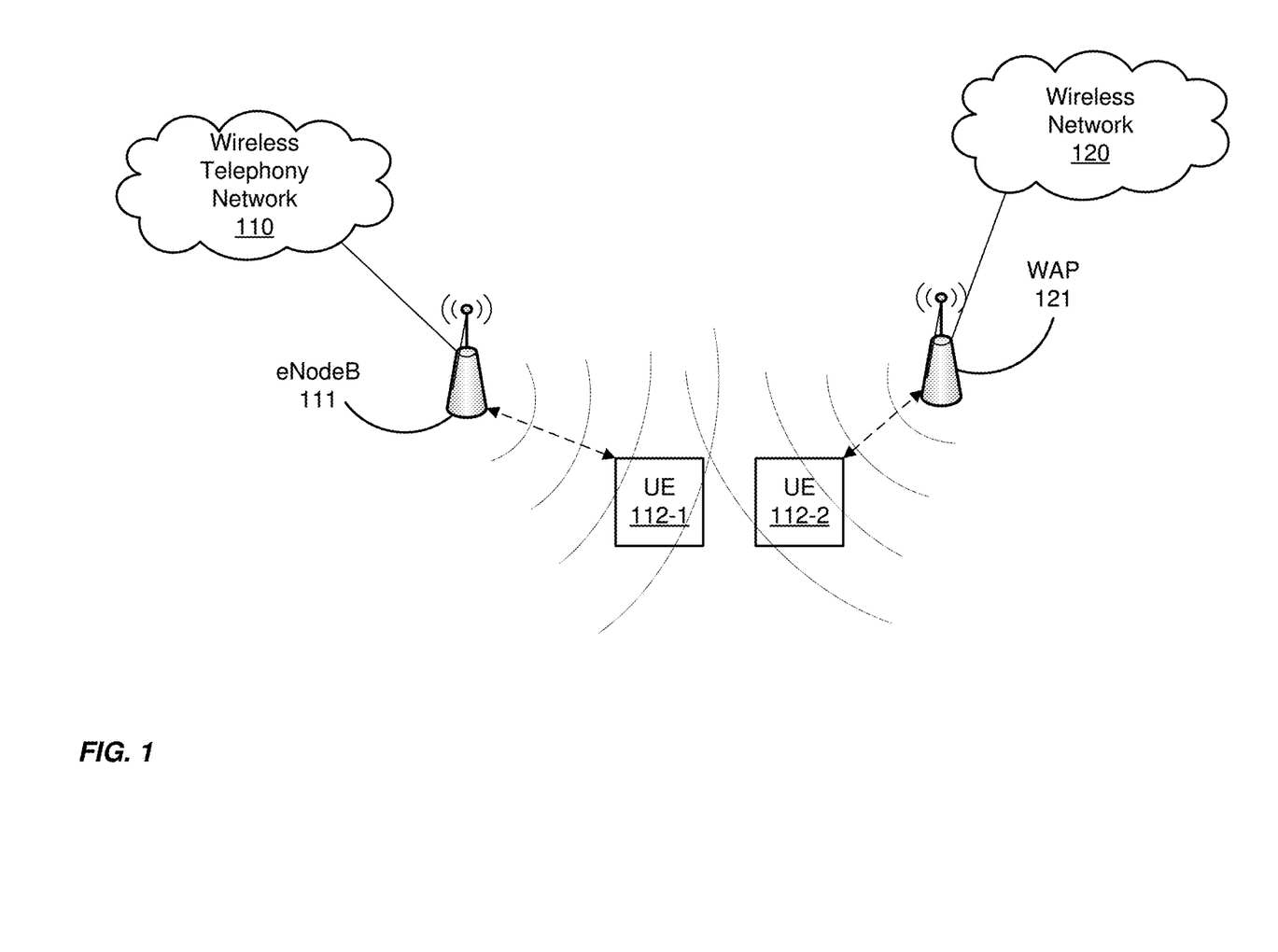
FIG. 1 is a block diagram of an exemplary wireless telecommunications system operating in an RF band with a conflicting wireless system.

FIG. 1 is a block diagram of an exemplary wireless telecommunications system operating in an RF band with a conflicting wireless system. The wireless telecommunications system comprises an eNodeB 111 communicatively coupled to a wireless telephony network 110. Generally, the eNodeB 111 is any system, apparatus, software, or combination thereof operable to maintain or otherwise support wireless communications, including data and voice, with subscribers via their UEs 112 (e.g., mobile handsets and other wireless devices). In this regard, the eNodeB 111 may implement the wireless communications of the wireless telephony network 110 over RF via, for example, 2G, 3G, LTE, or the like.

The conflicting wireless system comprises wireless access point (WAP) 121 communicatively coupled to the wireless network 120. The wireless system of the WAP 121 conflicts with the wireless telecommunications system of the eNodeB 111 as the wireless system of the WAP 121 uses a form of wireless technology that is incompatible with the communication protocols of the wireless telecommunications system of the eNodeB 111. Thus, communications between the UE 112-2 and the WAP 121 can interfere with the communications between the UE 112-1 and the eNodeB 111.

To illustrate, the eNodeB 111 may be part of an LTE wireless telephony network, whereas the WAP 121 may be part of a WiFi network (e.g., a WiFi hotspot or a personal WiFi router). Generally, this means that the eNodeB 111 is operating in an unlicensed band of RF where WiFi communications have flourished. Because these bands are so cluttered with WiFi communications, WiFi devices (e.g., the UE 112-2) employ Listen Before Talk (LBT) to ensure that they do not interfere with one another when operating via WiFi. LTE communications, however, tend to occupy an entire band of frequencies at any given time to ensure that their communications between their UEs 112 can be sustained. Thus, at the very least, an LTE wireless telephony network will interfere with other communication systems in the band. So, to be more "friendly" with other wireless systems in an unlicensed band, the embodiments herein provide for LBT operations between the UE 112-1 and an eNodeB 111 of a wireless telephony network 110.

The media access control (MAC) of LTE uses a centralized scheduler where the eNodeB 111 schedules UL and downlink (DL) traffic. LBT generally does not present problems on LTE DL transmissions because the eNodeB 112 transmits when it has successfully contended for a channel UL transmissions, however, are scheduled at precise instances of time and frequency. And, LBT disrupts the timing of the scheduled UL transmissions. But, the UE 112-1 needs to perform some form of LBT before each UL transmission because the channel may not be clear at the time of its scheduled transmission.

One way to ensure fair coexistence between LTE-U and WiFi is to modify the existing requirements to make it a "WiFi like" channel contention algorithm. In this regard, the UE 112-1 increases a size of a contention window, in some embodiments doubling the size of the contention window. For example, a WiFi node (e.g., WAP 121) determines that a transmission is successful if it receives an acknowledgement (ACK) shortly after the transmission. The lack of an ACK means a collision has occurred. The WiFi node, in turn, doubles the size (e.g., time) of its contention window and re-contends for the channel LTE, however, has no such mechanism.

Generally, if data received by the eNodeB 111 has an error, the eNodeB 111 buffers the data and sends a NACK, which prompts a re-transmission from the UE 112-1. When the eNodeB 111 receives the re-transmitted data, the eNodeB 111 combines that data with buffered data for error correction. This process may still occur but it is enhanced with the increase of the contention window size. One existing mechanism is Hybrid ARQ (HARQ). The embodiments herein provide a new mechanism to the PHY layer for LTE in this feedback process in addition to the existing HARQ mechanism at the MAC and PHY layers to ensure fast re-transmission and higher data rates.

In order to reduce the delay of the feedback loop needed to increase the contention window at the UE 112-1, the eNodeB 111 sends a non-acknowledgement (NACK) via a Short Control Signal (SCS), denoted as SCS NACK, without performing LBT, immediately after or shortly after the reception of the data. The SCS can be sent without performing LBT as long as the SCS duty cycle is under 5% of the maximum transmission time of the node, according to European Union standards.

Neighboring nodes perform LBT prior to transmission and "backoff" upon sensing the channel is busy after the transmission of the HARQ NACK. However, in LTE, the eNodeB 111 needs more processing time to perform error correction and soft combining on received data before determining whether a HARQ ACK or a HARQ NACK should be sent. Therefore, in addition to transmitting error correction codes (ECC) with data, the UE 112-1 includes a cyclic redundancy check CRC, which is generally short and has little impact on the efficiency of a payload such that an error can be detected more quickly. And, when an error is detected, an SCS NACK to be sent without LBT within a short time window after the data has been received by the eNodeB 111 to provide a relatively low probability of collision.

Figure 2:
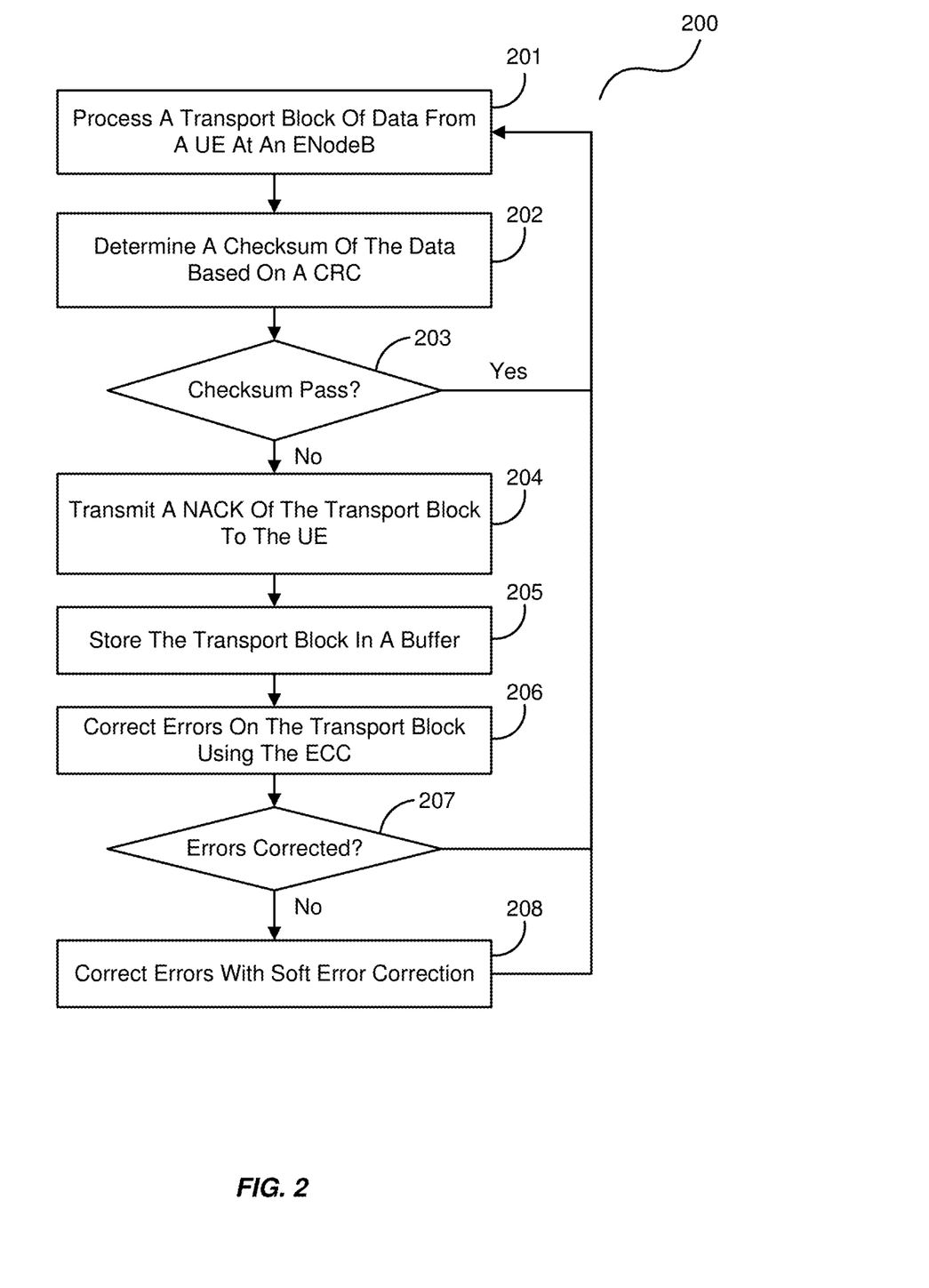
FIG. 2 is a flowchart illustrating an exemplary process operable with an eNodeB in the wireless telecommunications system.

FIG. 2 is a flowchart illustrating an exemplary process 200 operable with the eNodeB 111 in the wireless telecommunications system. In this embodiment, the eNodeB 111 receives the transport block of data from the UE 112-1, in the process element 201. The eNodeB 111 then uses a CRC in the transport block of data to determine a checksum of the data, in the process element 202. If the data passes the checksum (process element 203) then the eNodeB 111 processes the data and waits to receive another transport block of data from the UE 112-1, in the process element 201.

However, if the checksum fails, the eNodeB 111 transmits a NACK to the UE 112-1 such that the UE 112-1 can increase its contention window, in the process element 204. For example, the eNodeB 111 may use SCS to immediately transfer a HARQ NACK to the UE 1112-1 to ensure that the conflicting wireless communications between the UE 112-2 and the WAP 121 do not have time to contend for the channel. At about the same time, the eNodeB 111 stores the data of the transport block in a buffer, in the process element 205, to begin correcting errors on the data of the transport block using the ECC provided by the transport block, in the process element 206.

If the errors are corrected in the data using the ECC (process element 207), the eNodeB 111 transmits an ACK to the UE 112-2 and waits for the next transport block, in the process element 201. If this ACK is received by the UE 112-1 during the increased contention window of the UE 112-1, then the UE 112-1 may decrease the contention window back to its original size (e.g., amount of time) to resume normal operations. If the errors, however, are not corrected by the ECC, then the eNodeB 111 may begin correcting the errors with soft error correction, in the process element 208, upon reception of the same transport block from the UE 112-1. For example, the eNodeB 111 may combine the data of both transport blocks to determine errors in the data. Alternatively or additionally, the eNodeB 111 may use the CRC and/or the ECC of the subsequent transport block to determine the errors.

Figure 3:
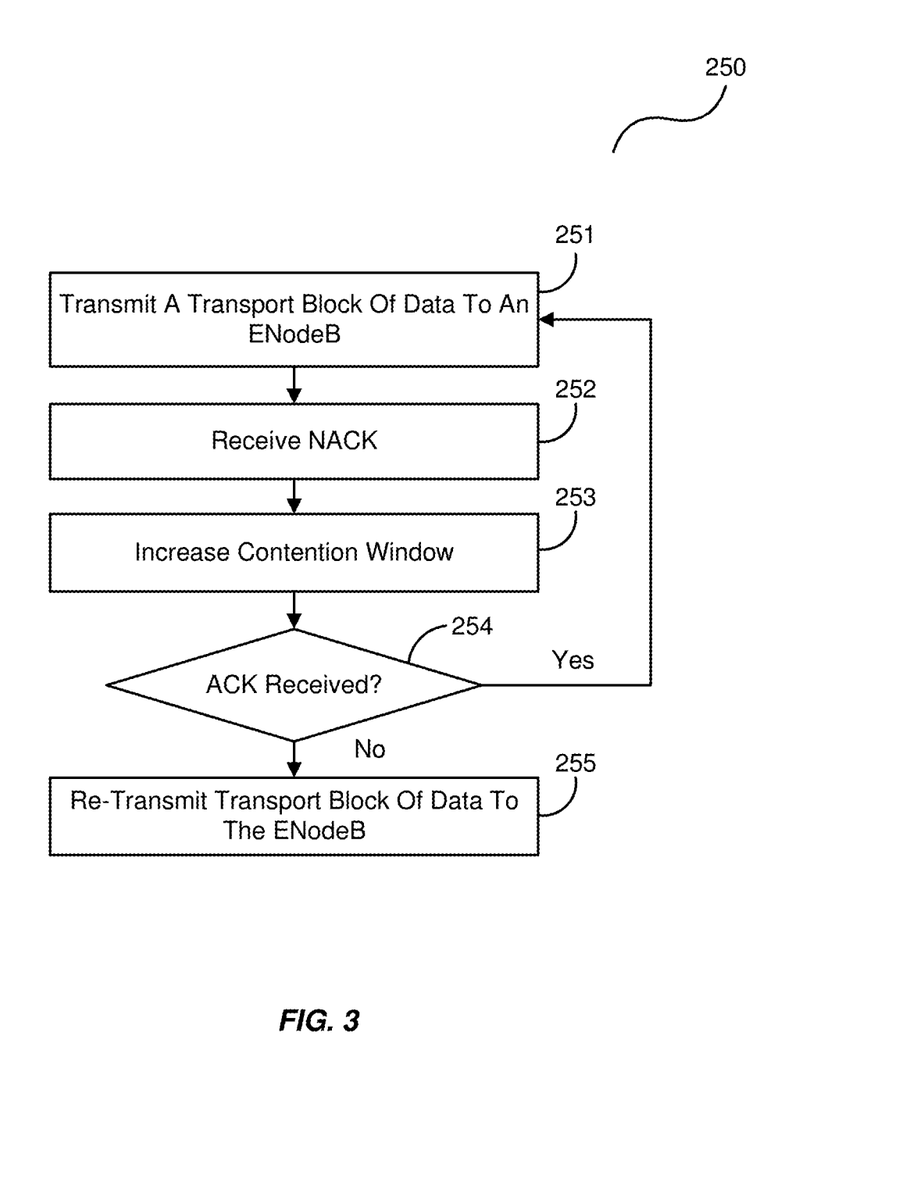
FIG. 3 is a flowchart illustrating an exemplary process operable with a UE in the wireless telecommunications system.

FIG. 3 is a flowchart illustrating an exemplary process 250 operable with the UE 112-1 in the wireless telecommunications system. In this embodiment, the UE 112-1 transmits a transport block of data to the eNodeB 111, in the process element 251. The transport block of data, as mentioned above, includes a CRC for the eNodeB 111 to perform a quick error check on the data of the transport block. And, if the data of the transport block contains errors, the eNodeB 111 immediately sends a NACK to the UE 112-1 (e.g., a HARQ NACK via SCS). In this regard, the UE 112-1 receives the NACK, in the process element 252, and increases its contention window, in the process element 253.

If an ACK is received by the UE 112-1 from the eNodeB 111 during the increased contention window, the UE 112-1 transmits its next transport block of data to the eNodeB 111, in the process element 251. Otherwise, the UE 112-1 may re-transmit the transport block of data to the eNodeB 111, in the process element 255.

In some embodiments, when the data of the transport block has expired, the UE 112-1 discards the data and the transport block. For example, the transport block may include a relatively small portion of voice data during a call of the UE 112-1. Dropping that relatively small portion of voice data may have a negligible effect on the overall voice conversation. Accordingly, the UE 112-1 may conclude that the transport block is no longer valid and drop the transport block from retransmission altogether.

Figure 4:
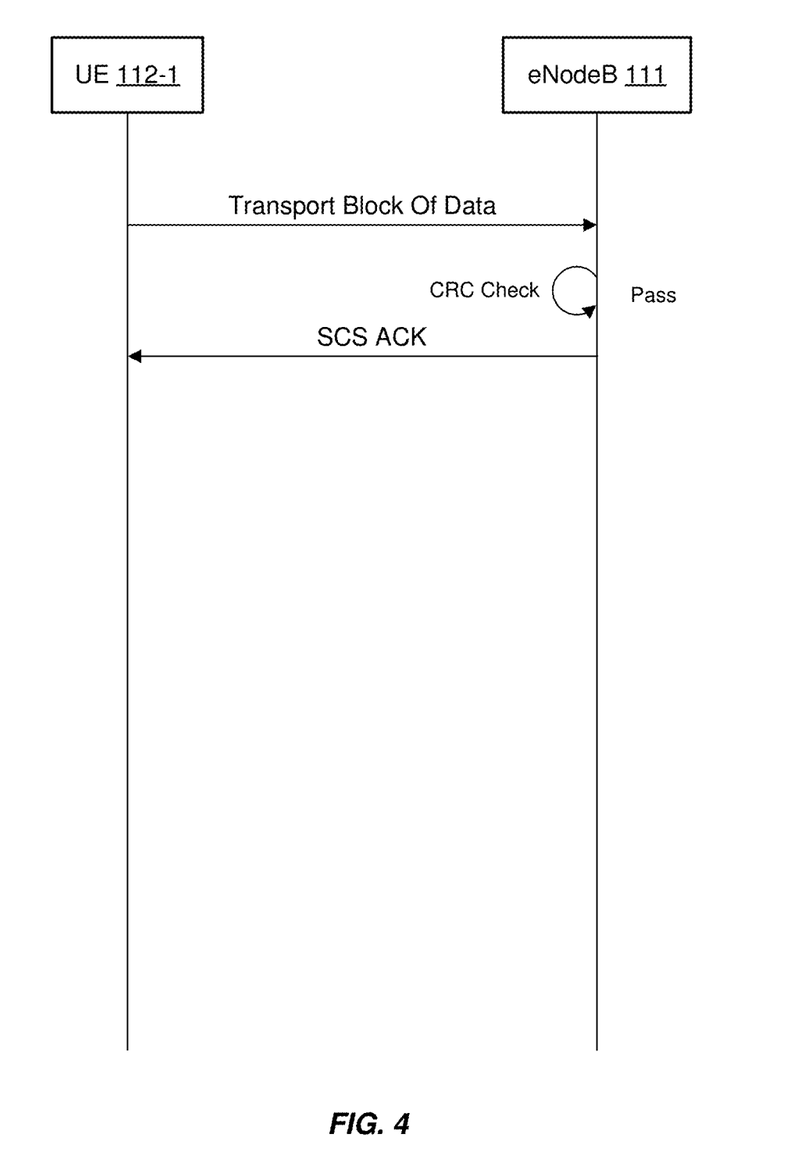
FIGS. 4-6 are exemplary messaging diagrams between a UE and an eNodeB in the wireless telecommunications system.
Figure 5:
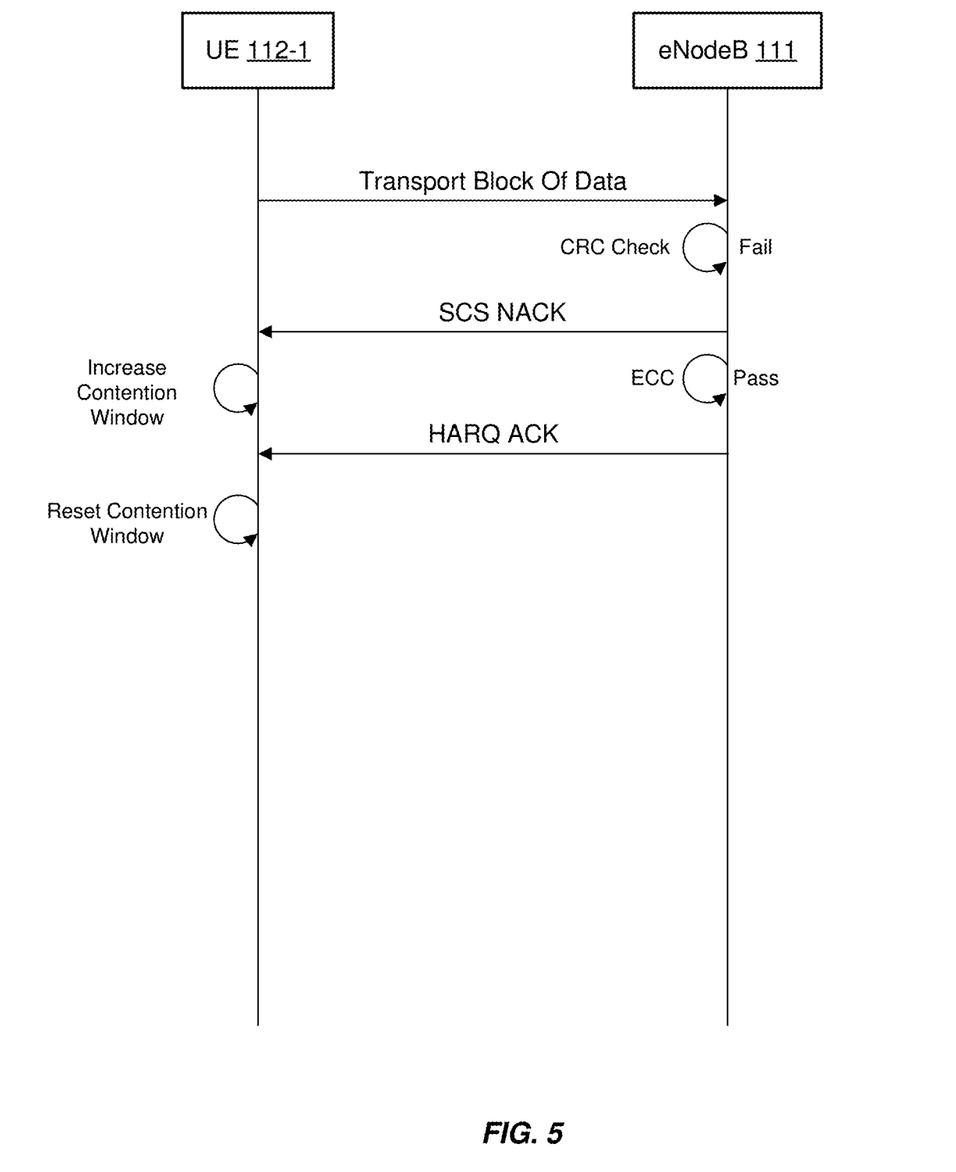
Figure 6:
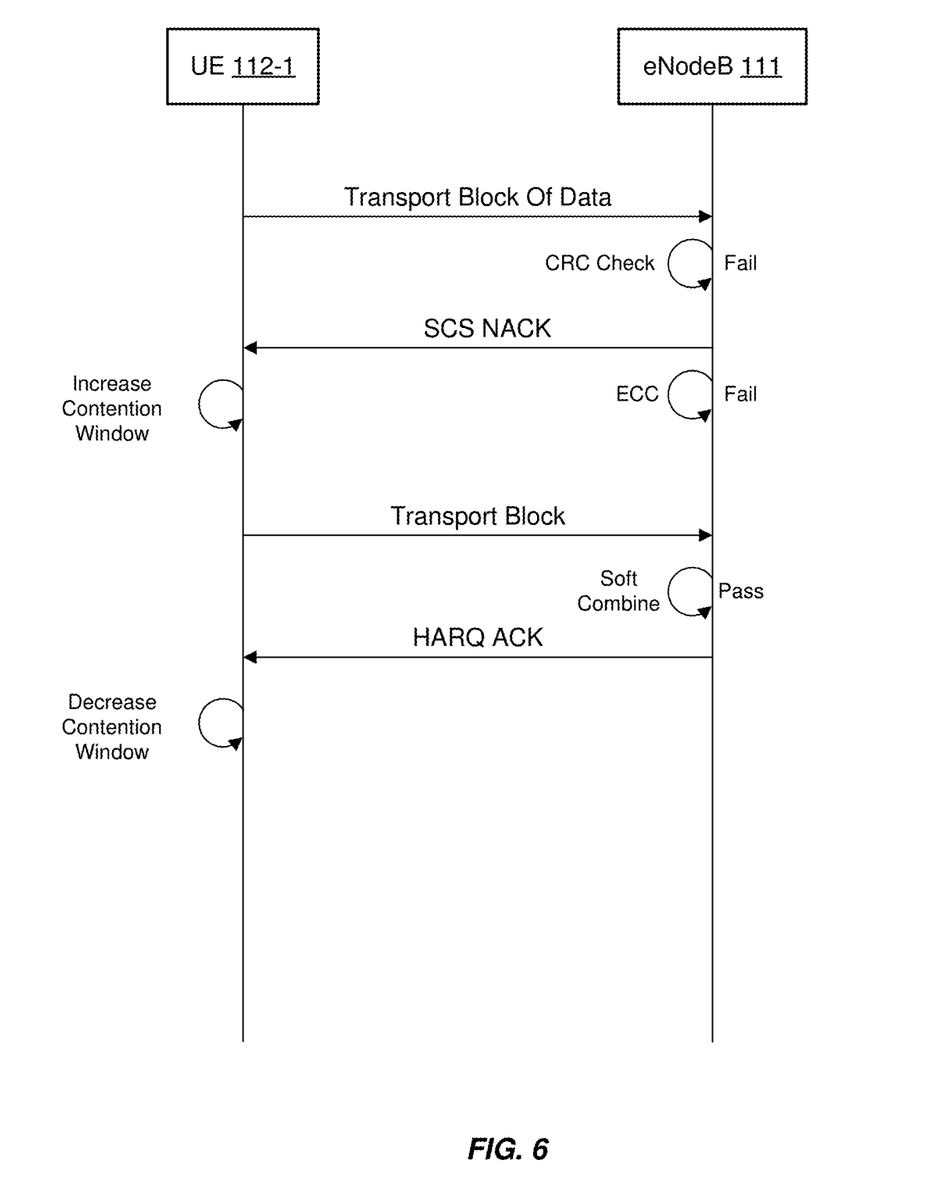

FIGS. 4-6 are exemplary messaging diagrams between the UE 112-1 and the eNodeB 111 in the wireless telecommunications system. The messaging diagram of FIG. 4 shows a successful transmission of data with the transport block to the eNodeB 111. Upon receiving the transport block from the UE 112-1, the eNodeB 111 performs the CRC check. As the resulting checksum has passed the CRC check, the eNodeB 111 sends the SCS ACK to the UE 112-1 as is typical in LTE communications.

The messaging diagram of FIG. 5 illustrates when the data of the transport block fails the CRC check. In this regard, the eNodeB 111 transfers an SCS NACK to the UE 112-1, which in turn, increases its contention window. During this time, the eNodeB 111 performs error correction using the ECC in the transport block. If the ECC successfully corrects the data of the transport block, the eNodeB 111 transfers a HARQ ACK to the UE 112-1 so that it may reset his contention window back to its original size.

The messaging diagram of FIG. 6 illustrates when both the CRC check and the ECC both fail. Since a SCS NACK has already been sent by the eNodeB 111 upon a failed CRC check, the eNodeB 111 does not need to send a HARQ NACK when the ECC fails also. An SCS NACK is an indication from the eNodeB 111 to the UE 112-1 to retransmit its transport block. Again, the UE 112-1 increases its contention window and retransmits a transport block to the eNodeB 111. The eNodeB 111 combines the data of the retransmitted transport block to perform a soft error correction using the ECC. If the soft error correction has passed, then the eNodeB 111 transmits an HARQ ACK to the UE 112-1 such that the UE 112-1 can reset its contention window.

Figure 7:
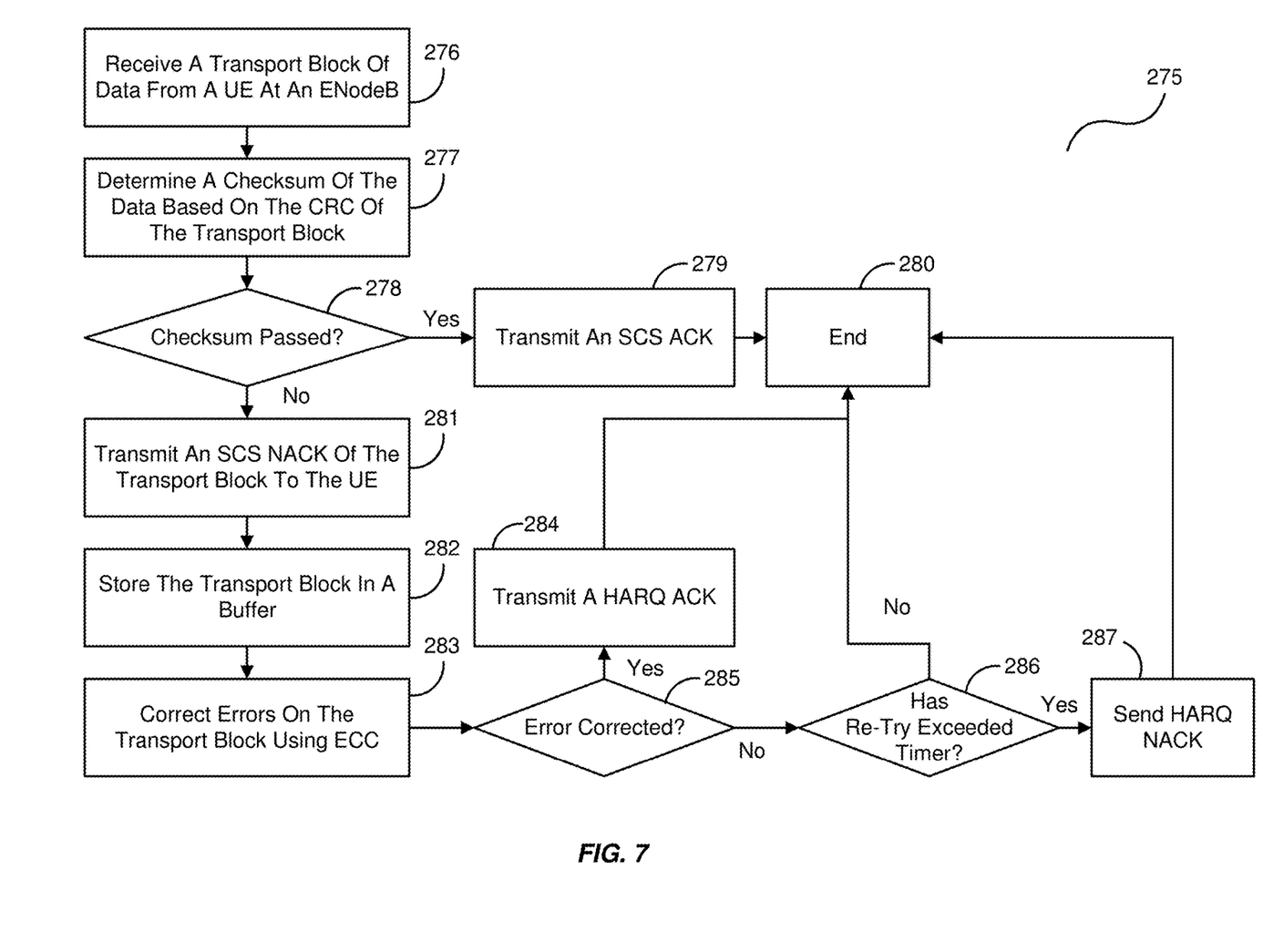
FIG. 7 is a flowchart illustrating another exemplary process operable with an eNodeB in the wireless telecommunications system.

FIG. 7 is a flowchart illustrating another exemplary process operable 275 with an eNodeB 111 in the wireless telecommunications system. In this embodiment, the eNodeB 111 receives a transport block of data from a UE 112, in the process element 276. Within the transport block is a CRC that is used to check the integrity of the data. In this regard, eNodeB 111 determines a checksum of the data based on the CRC of the transport block, in the process element 277. If the checksum passes (process element 278), then the eNodeB transmits an SCS ACK to the UE 112, in the process element 279 and the process ends, in the process element 280 (i.e., until the UE 112 needs to send another transport block of data).

If the checksum fails (the process element 278), then the eNodeB 111 transmits an SCS NACK of the transport block to the UE 112, in the process element 281. The eNodeB 111 stores the transport block of data in a buffer, in the process element 282, and then correct the errors on the transport block using the ECC in the transport, in the process element 283. If the errors are corrected (process element 285) then the eNodeB 111 transmits a HARQ ACK to the UE 112, in the process element 284, and the process ends, in the process element 280, until the UE 112 needs to transmit another transport block to the eNodeB 111.

If the errors in the transport block cannot be corrected (i.e., the process element 285), then the eNodeB 111 determines whether a re-try attempt has exceeded its timer, in the process element 286. If the timer has not expired, then the eNodeB 111 may end the process 275, in the process element 280, until the UE 112 needs to send another transport block. If the timer has expired, then the eNodeB 111 may send a HARQ NACK to the UE 112, in the process element 287, to end the process 275 until the UE 112 needs to transmit another transport block the eNodeB 111.

Figure 8:
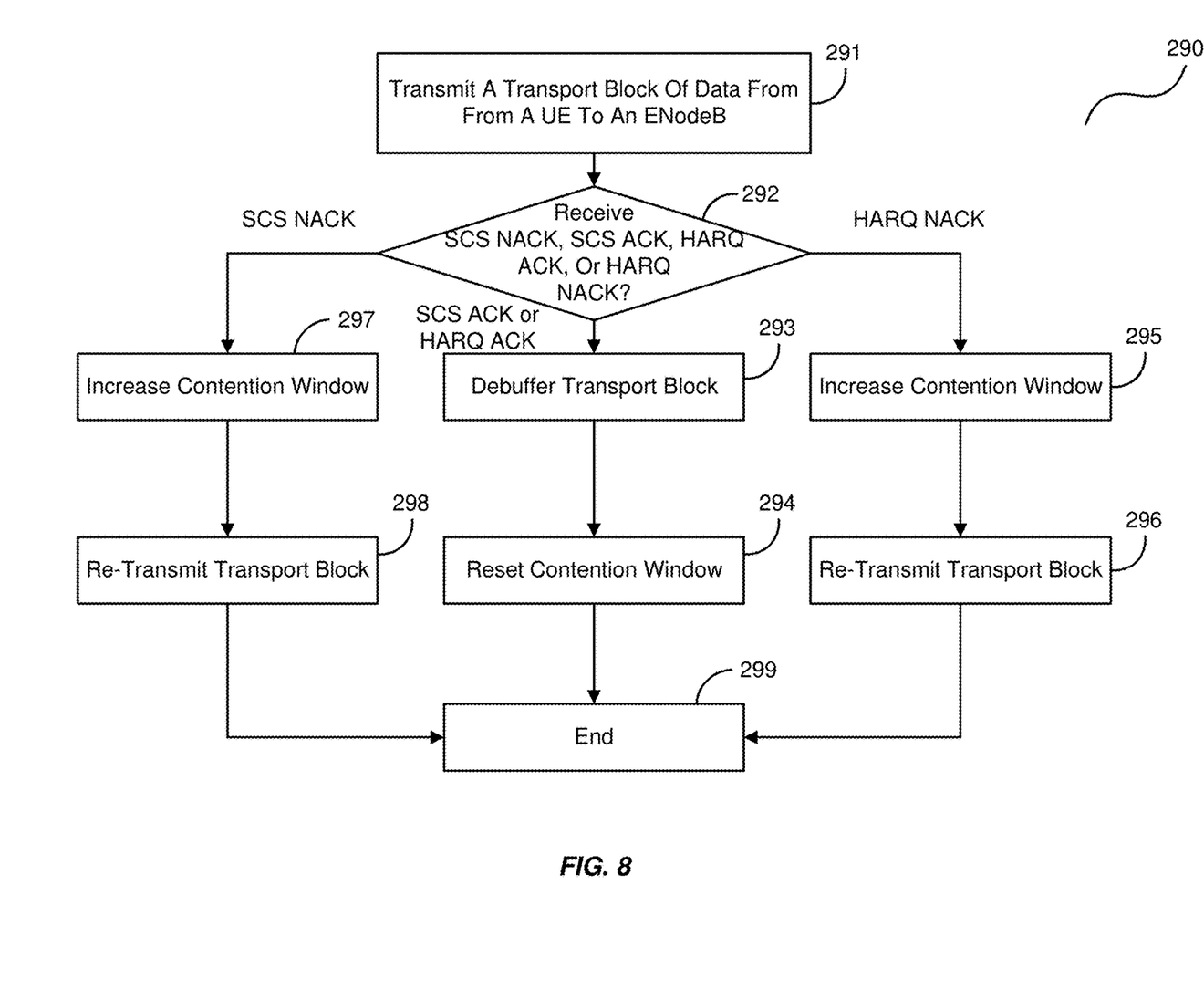
FIG. 8 is a flowchart illustrating another exemplary process operable with a UE in the wireless telecommunications system.

FIG. 8 is a flowchart illustrating another exemplary process 290 operable with a UE 112 in the wireless telecommunications system. In this embodiment, the UE 112 transmits a transport block of data to an eNodeB 111, in the process element 291. Then, the UE 112 determines whether it has received an SCS NACK, an SCS ACK, a HARQ ACK, or a HARQ NACK, in the process element 292.

If the UE 112 receives an SCS NACK, then the UE 112 increases a contention window, in the process element 297, and retransmits the transport block, in the process element 298. Then, the process 290 ends, in the process element 299, until the UE 112 needs to transmit another transport block.

If the UE 112 receives an SCS ACK or a HARQ ACK, then the UE 112 debuffers the transport block, in the process element 293. For example, as the transport block is successfully received by the eNodeB 111, the UE 112 no longer has a need to retain the transport block. Accordingly, the UE 112 removes the transport block from transmission such that another transport block can be transmitted. From there, the UE 112 resets its contention window, in the process element 294, and the process 290 ends, in the process element 299 (i.e., until the UE 112 needs to send another transport block of data).

If the UE 112 receives a HARQ NACK, the UE 112 increases its contention window, in the process element 295, and retransmits the transport block, in the process element 296. This allows the eNodeB 111 to correct the errors in the transport block via soft combining and/or error correction (e.g., via the ECC of the transport). Then, the process 290 ends, in the process element 299 (i.e., until the UE 112 needs to send another transport block of data).

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 7 illustrates a computing system 300 in which a computer readable medium 306 may provide instructions for performing any of the methods disclosed herein.

Figure 9:
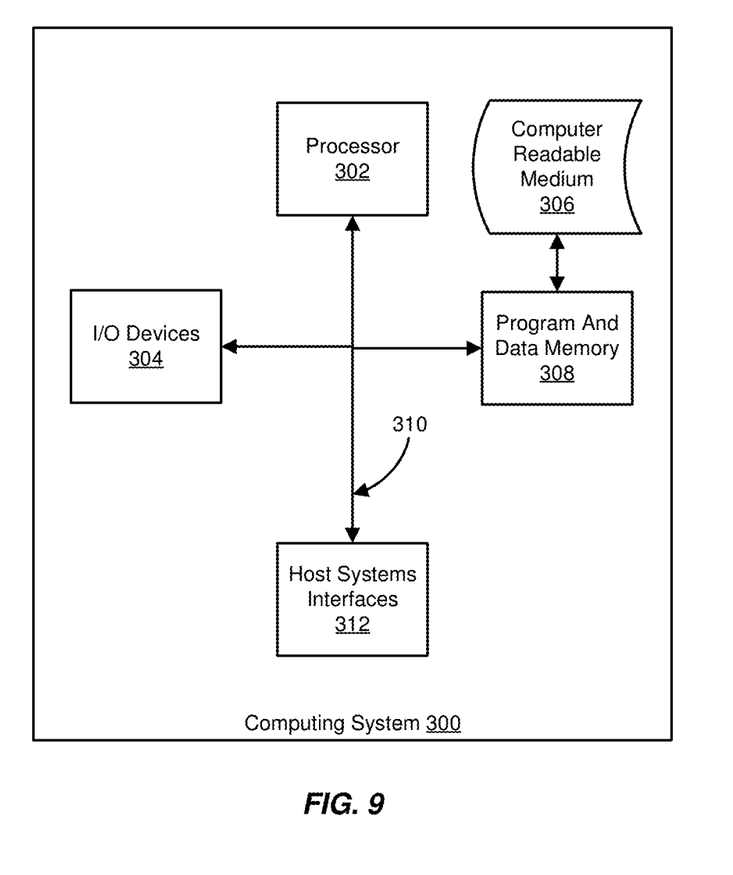
FIG. 9 is a block diagram of an exemplary computing system in which a computer readable medium provides instructions for performing methods herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:

1. A method operable with a Long Term Evolution (LTE) communications operating in a radio frequency (RF) band comprising a conflicting wireless technology, the method comprising:
    processing a transport block of data from a user equipment (UE) at an eNodeB, the transport block comprising a cyclic redundancy check (CRC) and an error correction code (ECC);
    determining a checksum of the transport block based on the CRC at the eNodeB;
    failing the checksum;
    transmitting, from the eNodeB to the UE, a non-acknowledgement (NACK) of the transport block based on the failed checksum, wherein the NACK is transmitted before the eNodeB attempts to correct errors on the transport block using the ECC;
    in response to the UE receiving the NACK, increasing a contention window at the UE; and
    re-transmitting the transport block from the UE to the eNodeB.

2. The method of claim 1, wherein
    the method further comprises, at the eNodeB:
    storing the transport block in a buffer;
    correcting errors on the transport block using the ECC; and
    sending an acknowledgement (ACK) of successful receipt of the transport block to the UE in response to correcting the errors.

3. The method of claim 2, further comprising, at the UE:
    receiving the ACK within the increased contention window; and
    resetting the contention window to its original size in response to receiving the ACK.

4. The method of claim 1, wherein:
    transmitting the NACK further comprises configuring the NACK in a Short Control Signal (SCS) to the UE.

5. The method of claim 1, further comprising:
    receiving another transport block of data from the UE at the eNodeB, the other transport block comprising another cyclic redundancy check (CRC);
    determining a checksum of the other transport block based on the CRC at the eNodeB;
    passing the checksum; and
    transmitting, from the eNodeB to the UE, an acknowledgement (ACK) of successful receipt of the other transport block.

6. The method of claim 1, wherein:
    the ACK is a Hybrid Automatic Repeat Request (HARQ) ACK.

7. The method of claim 1, wherein:
    the RF band is a WiFi band.

8. A system operable with a Long Term Evolution (LTE) communications operating in a radio frequency (RF) band comprising a conflicting wireless technology, the system comprising:
    an eNodeB; and
    a user equipment (UE)
    wherein the eNodeB is operable to process a transport block of data from the UE, the transport block comprising a cyclic redundancy check (CRC) and an error correction code (ECC), the eNodeB being further operable to determine a checksum of the transport block based on the CRC, to fail the checksum, and to transmit a non-acknowledgement (NACK) of the transport block to the UE based on the failed checksum before the eNodeB attempts to correct errors on the transport block using the ECC;
    wherein the UE is operable to receive the NACK, to increase a contention window, and to re-transmit the transport block to the eNodeB.

9. The communication system of claim 8, wherein:
    the eNodeB is further operable to store the transport block in a buffer, to correct errors on the transport block using the ECC, and to send an acknowledgement (ACK) of successful receipt of the transport block to the UE in response to correcting the errors.

10. The communication system of claim 9, wherein:
    the UE is further operable to receive the ACK within the increased contention window, and to reset the contention window to its original size in response to receiving the ACK.

11. The communication system of claim 8, wherein:
    the eNodeB is further operable to transmit the NACK by configuring the NACK in a Short Control Signal (SCS) to the UE.

12. The communication system of claim 8, wherein:
    the eNodeB is further operable to receive another transport block of data from the UE, the other transport block comprising another cyclic redundancy check (CRC), the eNodeB being further operable to determine a checksum of the other transport block based on the CRC, to pass the checksum, and to transmit an acknowledgement (ACK) of successful receipt of the other transport block to the UE.

13. The communication system of claim 8, wherein:
    the ACK is a Hybrid Automatic Repeat Request (HARQ) ACK.

14. The communication system of claim 8, wherein:
    the RF band is a WiFi band.

15. A non-transitory computer readable medium comprising instructions that, when executed by a processor of an eNodeB employing Long Term Evolution (LTE) communications operating in a radio frequency (RF) band comprising a conflicting wireless technology, direct the processor to:
    process a transport block of data from a user equipment (UE), the transport block comprising a cyclic redundancy check (CRC) and an error correction code (ECC);

determine a checksum of the transport block based on the CRC;

fail the checksum; and transmit a non-acknowledgement (NACK) of the transport block to the UE based on the failed checksum before the eNodeB attempts to correct errors on the transport block using the ECC, wherein the NACK directs the UE to increase a contention window at the UE and re-transmit the transport block to the eNodeB.

16. The computer readable medium of claim 15, wherein: the instructions further direct the processor to store the transport block in a buffer, correct errors on the transport block using the ECC, and to send an acknowledgement (ACK) of successful receipt of the transport block in response to correcting the errors.

17. The computer readable medium of claim 16, wherein: the UE is further operable to receive the ACK within the increased contention window, and to reset the contention window to its original size in response to receiving the ACK.

18. The computer readable medium of claim 15, wherein the instructions further direct the processor to:

configure the NACK in a Short Control Signal (SCS) to the UE.

19. The computer readable medium of claim 15, wherein the instructions further direct the processor to:

receive another transport block of data from the UE at the eNodeB, the other transport block comprising another cyclic redundancy check (CRC);

determine a checksum of the other transport block based on the CRC at the eNodeB;

pass the checksum; and transmit an acknowledgement (ACK) of successful receipt of the other transport block to the UE.

20. The computer readable medium of claim 15, wherein:

the ACK is a Hybrid Automatic Repeat Request (HARQ) ACK.

\* \* \* \* \*